United States Patent
Tennill et al.

(10) Patent No.: US 11,373,137 B2
(45) Date of Patent: Jun. 28, 2022

(54) RFID ENTERPRISE INVENTORY MANAGEMENT SYSTEMS AND METHODS

(71) Applicant: SML Intelligent Inventory Solutions LLC, Plano, TX (US)

(72) Inventors: Clinton Leroy Tennill, Frisco, TX (US); Craig Lawrence Tennill, Frisco, TX (US); Travis Clayton Ernst, Frisco, TX (US); Samuel Andrew Shaw, Plano, TX (US)

(73) Assignee: SML Intelligent Inventory Solutions LLC, Plano, TX (US)

( * ) Notice: Subject to any disclaimer, the term of this patent is extended or adjusted under 35 U.S.C. 154(b) by 0 days.

(21) Appl. No.: 15/929,828

(22) Filed: May 22, 2020

(65) Prior Publication Data
US 2020/0374672 A1 Nov. 26, 2020

Related U.S. Application Data

(60) Provisional application No. 62/851,456, filed on May 22, 2019.

(51) Int. Cl.
*G06F 16/21* (2019.01)
*G06Q 10/08* (2012.01)
(Continued)

(52) U.S. Cl.
CPC ........... *G06Q 10/087* (2013.01); *G06F 16/21* (2019.01); *G06K 7/10099* (2013.01);
(Continued)

(58) Field of Classification Search
CPC ....... G06Q 10/087; G06F 30/00; G06F 30/20; G06K 7/10
See application file for complete search history.

(56) References Cited

U.S. PATENT DOCUMENTS

2010/0042380 A1* 2/2010 Suh .................... G06F 30/00
703/1
2013/0282184 A1* 10/2013 Noureldin ............ G05D 23/19
700/276

(Continued)

*Primary Examiner* — Benyam Haile
(74) *Attorney, Agent, or Firm* — Boisbrun Hofman, PLLC; Roger Burleigh

(57) ABSTRACT

System and method for simulating the operation of an enterprise inventory management system. The general method includes instantiating at least a first instance of a simulated RFID interrogator subsystem on a computing system; generating, by the simulated RFID interrogator subsystem, data representative of the simulated reading of RFID tags associated with virtual inventory items and reporting the data to a global inventory database subsystem; receiving, at the global inventory database subsystem, the data from the simulated RFID interrogator subsystem; generating one or more performance metrics for the global inventory database subsystem based on the receipt of the data from the simulated RFID interrogator subsystem; and, in response to the one or more performance metrics, altering the generation rate of the data by the first instance of the simulated RFID interrogator subsystem, or instantiating additional instances of the simulated RFID interrogator subsystem to generate additional data, until a performance metric of the global inventory database system reaches a predefined limit.

16 Claims, 6 Drawing Sheets

(51) Int. Cl.
*G06K 7/10* (2006.01)
*H04W 4/35* (2018.01)
*G06K 19/077* (2006.01)

(52) U.S. Cl.
CPC ..... *G06K 7/10297* (2013.01); *G06K 7/10366* (2013.01); *G06K 7/10376* (2013.01); *G06K 7/10415* (2013.01); *G06K 19/07758* (2013.01); *H04W 4/35* (2018.02); *G06K 2007/10504* (2013.01)

(56) References Cited

U.S. PATENT DOCUMENTS

2014/0222525 A1* 8/2014 Heckman, III ......... G06F 30/20
　　　　　　　　　　　　　　　　　　　703/13
2020/0074020 A1* 3/2020 Bhagchandani ....... G06N 20/00

* cited by examiner

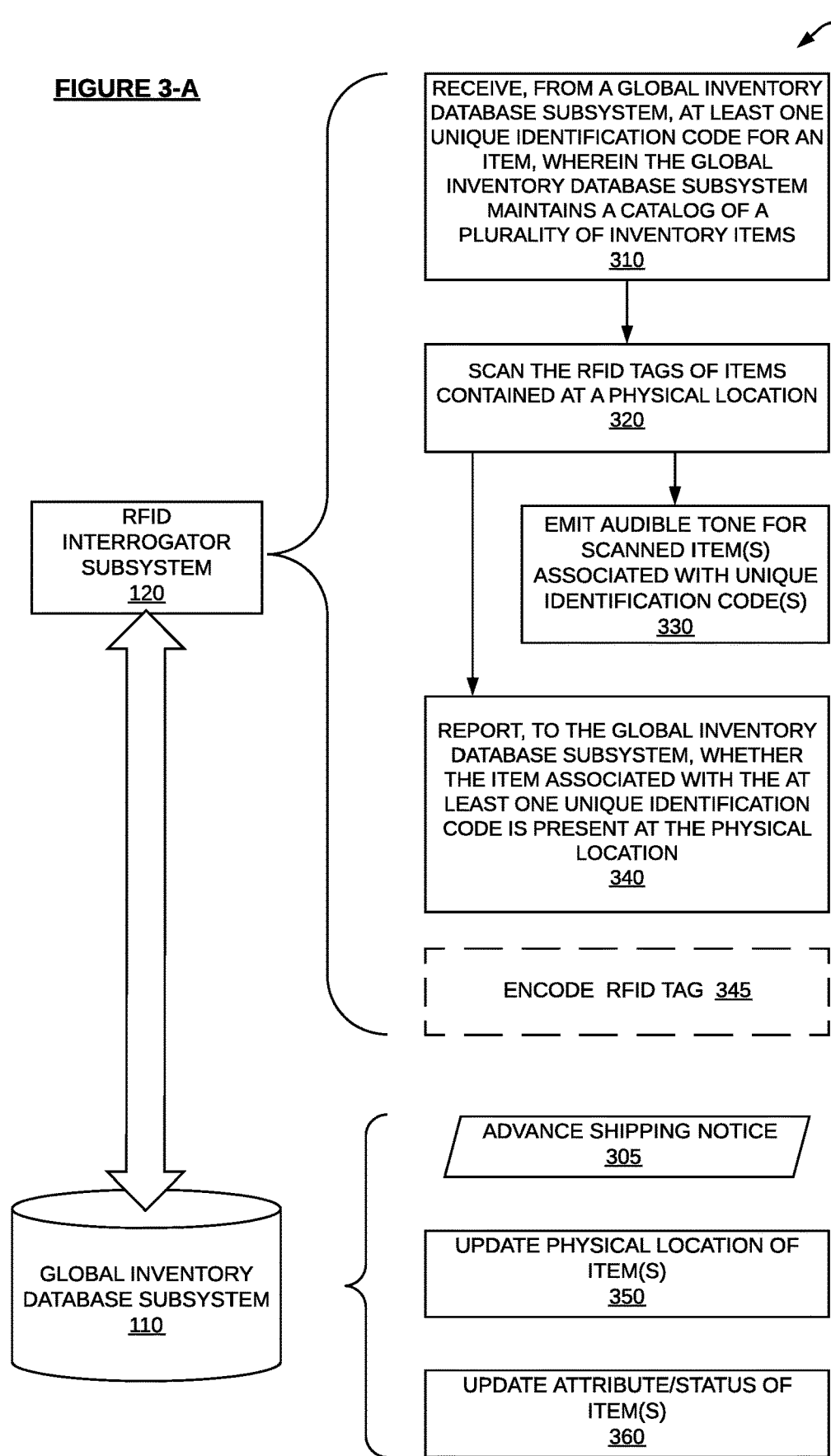

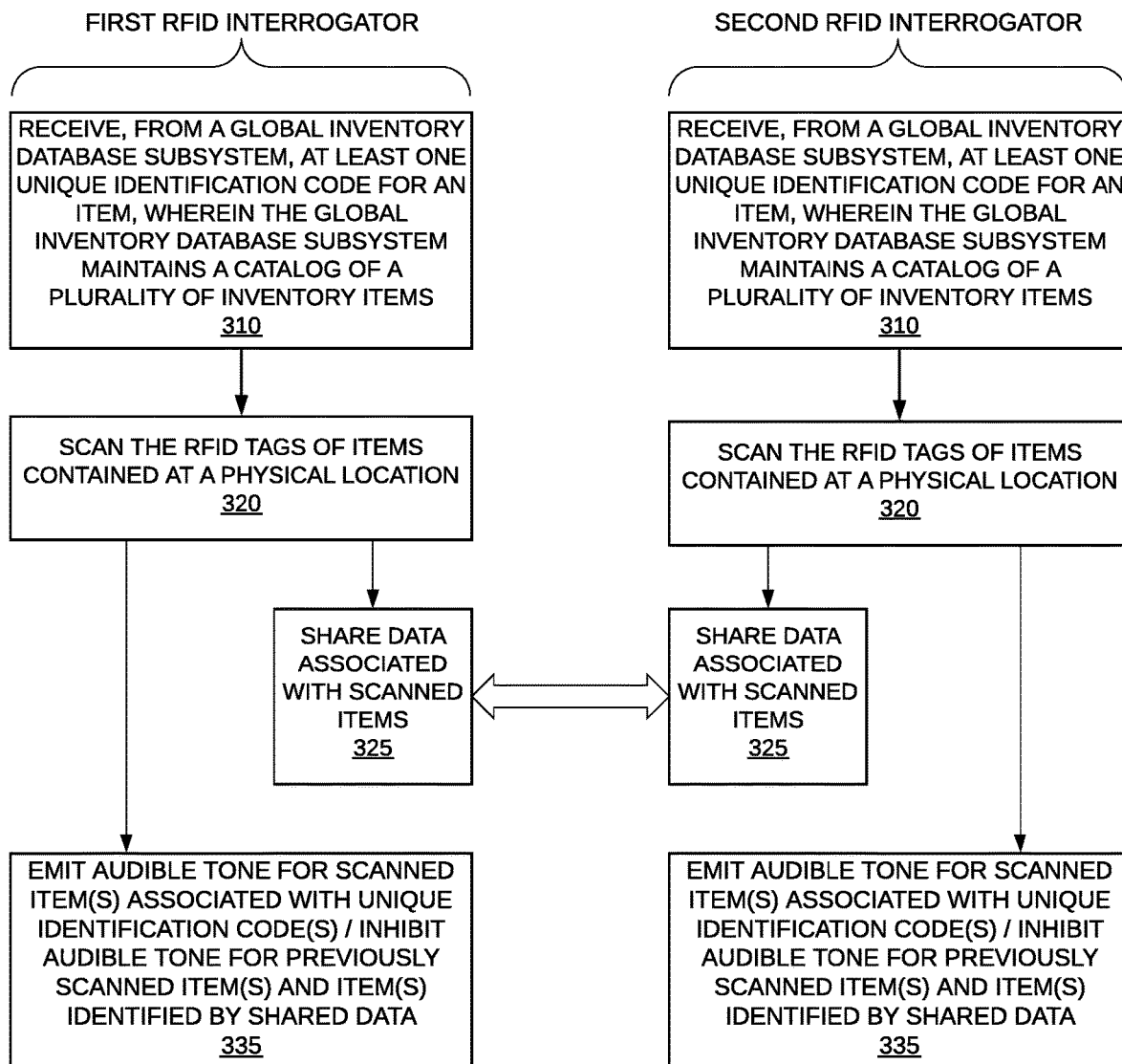

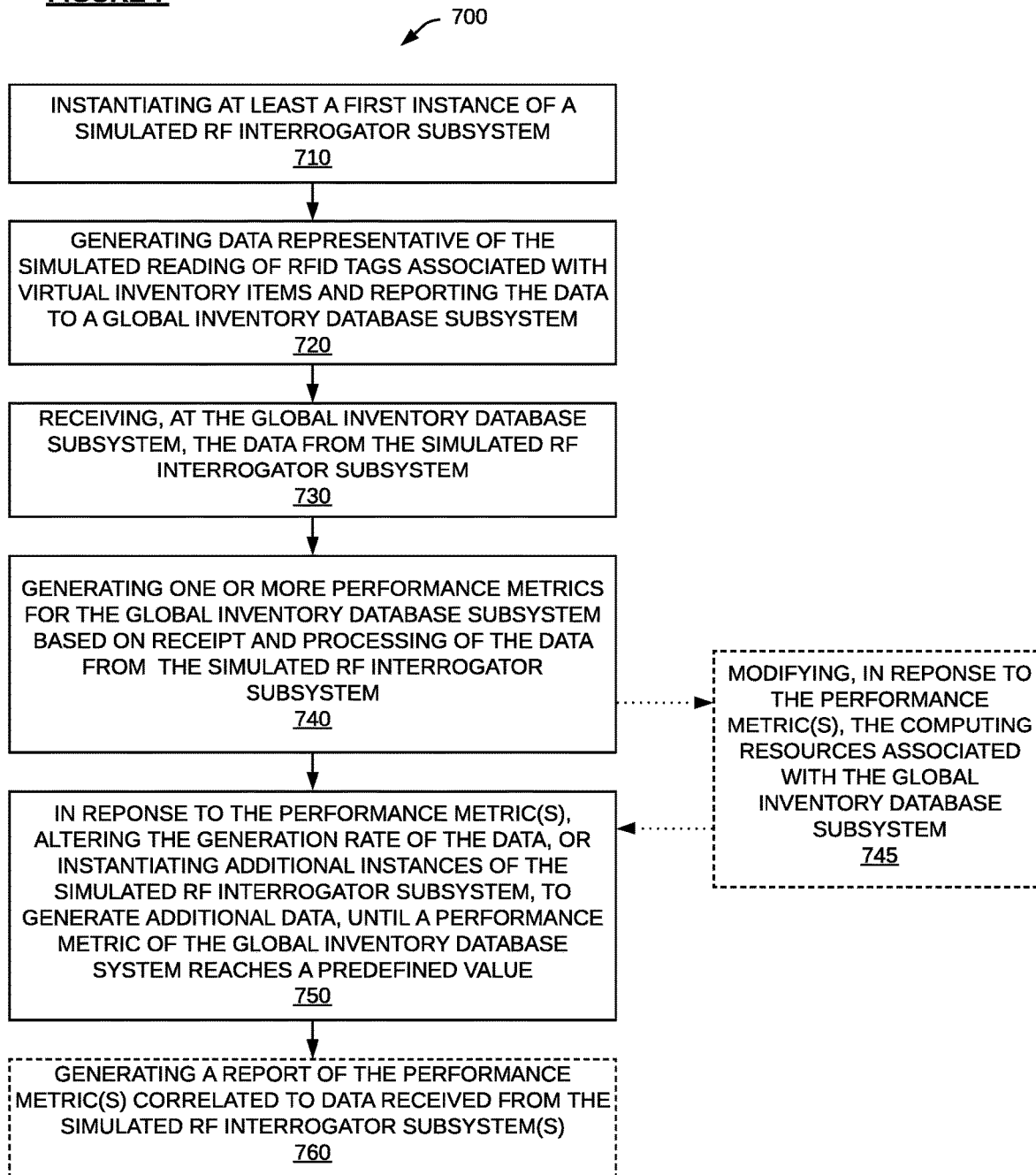

RFID ENTERPRISE INVENTORY MANAGEMENT SYSTEMS AND METHODS

RELATED APPLICATIONS

This application claims the benefit of U.S. Provisional Application No. 62/851,456, entitled "Inventory Management System and Method of Operating the Same," filed May 22, 2019, which is incorporated herein by reference.

TECHNICAL FIELD

The disclosure is directed, in general, to supply chain management systems and methods; and, in particular, to radio frequency identification (RFID) based enterprise inventory management systems and methods.

BACKGROUND

Supply chain management is utilized to manage the storage and movement of goods, including raw materials, work-in-process, and finished goods, from the point of origin to points of purchase or consumption. Reasons to accurately account for articles in an enterprise include tracking shipments from a bulk vendor, reduction of inventory for just-in-time manufacturing operations, reduction of shrinkage due to breakage and pilfering, managing claims against a manufacturer, and validating sales and other dispositions of articles. With continued growth and emphasis on efficiency of enterprises such as retail and warehousing operations, for both online commerce and physical brick-and-mortar stores, it is increasingly important to account for and track the actual inventory at each enterprise location in real time.

An enterprise can include hundreds of warehouses and retail locations, each of which may contain hundreds of thousands of articles that require tracking, and collectively require tens of millions of articles to be tracked throughout the enterprise. Historically, it was sufficient to perform inventory operations on a monthly or annual basis. Such inventory operations were often performed manually or by optically scanning barcodes, sometimes even relying on paper notebooks to tally results. The scale of many modern enterprises, however, magnifies the inefficiencies of performing frequent inventory management processes using primitive techniques.

Technologies have evolved to more precisely identify inventory items. In particular, radio frequency identification (RFID) uses electromagnetic fields to automatically identify and track tags attached to objects. An RFID tag consists of a tiny radio transponder; a radio receiver and transmitter. When triggered by an electromagnetic pulse from a nearby RFID interrogator, the tag transmits digital data, usually an identifying inventory number, back to the RFID interrogator; the number can be used to inventory goods. Periodically registering the identities and numbers of items with an enterprise, however, is insufficient to meet the demands of modern commercial enterprises, such as reduced overhead and high accuracy. Accordingly, there is a need in the art for novel enterprise inventory management systems and methods that improve the state of the art through the use of RFID technology.

SUMMARY

To improve the state of the art, disclosed herein is an enterprise inventory management system, and methods of use thereof, utilizing novel functionalities. The system includes a global inventory database subsystem for cataloging a plurality of inventory items, each of the items identified by at least a unique identification code, such as an Electronic Product Code (EPC); and, a radio frequency identification (RFID) interrogator subsystem, the RF interrogator subsystem operative to read RFID tags associated with each of the plurality of inventory items, wherein each of the RFID tags is programmed with at least a unique identification code for its associated item. The disclosed system and methods provide functionality for improved single item identification/location, verification of shipping and receiving of a plurality of inventory items, and inventory operations utilizing single or multiple RFID interrogators. The enterprise inventory management system can also include a motion detection subsystem for detecting and identifying any inventory items moving from a first physical zone to a second physical zone. A disclosed system and method for simulating the operation of the enterprise inventory management system can be used to design and optimize the system.

In general, the disclosed methods for maintaining inventory data in an enterprise inventory management system include the functions of utilizing an RFID interrogator subsystem to read RFID tags associated with inventory items; the RFID interrogator subsystem is operable to receive, from the global inventory database subsystem, at least one unique identification code for an item; scan the RFID tags of items contained at a physical location; and, report, to the global inventory database subsystem, whether the item associated with the at least one unique identification code is present at the physical location. The RFID interrogator subsystem is further operable to receive an Advance Shipping Notice (ASN) from the global inventory database subsystem, wherein the ASN identifies a plurality of new inventory items to be received at a physical location; and, scan the RFID tags of all items contained in a shipment, whereby receipt of all expected items identified in the ASN can be verified.

The RFID interrogator subsystem can emit an audible tone when an item associated with a unique identification code is scanned. When an RFID interrogator has received a plurality of unique identification codes associated with a like plurality of items, it can emit an audible tone only the first time an item associated with a unique identification codes is scanned, whereby the presence or absence of the plurality of items can be confirmed when all items at the physical location have been scanned and no further audible tone is emitted. The report sent to the global inventory database subsystem can identify at least one of the presence or absence of each of the plurality of items at the physical location. The physical location can be, for example, the sales floor or a back stock area of a retail store. The report to the global inventory database subsystem can cause it to update the physical location of ones of the plurality of items scanned by the RF interrogator subsystem.

The global inventory database subsystem can maintain at least one attribute for each of the plurality of inventory items; an attribute can, for example, define a status of an associated item. In some applications, a status can identify whether an item is available, reserved, sold, damaged, on display, or unsalable. The global inventory database subsystem can update an attribute/status of an inventory item in response to the receipt of a report from the RF interrogator subsystem. An RFID interrogator can also encode an RFID tag associated with an inventory item with a status.

An RFID interrogator subsystem can comprise a plurality of fixed or mobile RFID interrogators; a mobile RFID interrogator can be, for example, handheld. In some applications, a plurality of mobile RFID interrogators, including at least first and second handheld RFID interrogators, are each operative to share data associated with scanned items, the data including at least the unique identification code for each scanned item. The data associated with scanned items can include the date and time of a scanning event, whereby the enterprise inventory management system can synchronize data associated with each inventory item received from different RFID interrogators. In some embodiments, the data is shared between RFID interrogators in real-time; the data can be directly shared between handheld readers via a wireless connection or indirectly via the global inventory database subsystem. For applications in which data is shared between handheld RFID interrogators, each interrogator can emit an audible tone only the first time an item associated with a unique identification code is scanned, and inhibit the audible tone when scanning an item associated with a unique identification code previously scanned by the same or another of the handheld RFID interrogators, whereby the presence or absence of a plurality of items can be confirmed when all items at a physical location have been scanned and no further audible tone is emitted by any of the handheld RFID interrogators.

Also disclosed herein is a method to maintain inventory location data in an enterprise inventory management system, wherein the system includes a global inventory database subsystem for cataloging a plurality of inventory items, each of the inventory items identified in the database by at least a unique identification code and a physical location. The method includes the steps of detecting, using a motion detection subsystem, movement within a region between a first physical zone and a second physical zone; enabling, in response to detecting movement, an RFID interrogator subsystem; identifying, utilizing the RF interrogator subsystem, any inventory items moving from the first physical zone to the second physical zone; and, reporting, to the global inventory database subsystem, the identity of each identified inventory item, whereby the global inventory database system can update the physical location of each item from the first physical zone to the second physical zone. The motion detection system can utilize, for example, an infrared sensor, a microwave sensor, an ultrasonic sensor, or a video camera sensor. The first and second physical zones can be, for example, associated with the sales floor and back stock regions of a store.

In one embodiment, the motion detection system includes at least first and second motion detection sensors positioned such that movement from a first physical zone to a second physical zone is indicated if the first sensor is triggered before the second sensor, and from the second physical zone to the first physical zone if the second sensor is triggered before the first sensor. Alternatively, or in addition, the RFID interrogator system can include at least first and second RFID interrogators positioned such that their associated read zones are non-overlapping, and wherein movement of an item from the first physical zone to the second physical zone is indicated if the first RFID interrogator reads an RFID tag of the item before the second RFID interrogator, and from the second physical zone to the first physical zone if the second RFID interrogator reads the RFID tag of the item before the first RFID interrogator.

Finally, also disclosed is a system and method for simulating the operation of an enterprise inventory management system. The general method includes instantiating at least a first instance of a simulated RFID interrogator subsystem on a computing system; generating, by the simulated RFID interrogator subsystem, data representative of the simulated reading of RFID tags associated with virtual inventory items and reporting the data to a global inventory database subsystem; receiving, at the global inventory database subsystem, the data from the simulated RFID interrogator subsystem; generating one or more performance metrics for the global inventory database subsystem based on the receipt of the data from the simulated RFID interrogator subsystem; and, in response to the one or more performance metrics, altering the generation rate of the data by the first instance of the simulated RFID interrogator subsystem, or instantiating additional instances of the simulated RFID interrogator subsystem to generate additional data, until a performance metric of the global inventory database system reaches a predefined limit. A performance metric can, for example, represent an instantaneous value or an average value associated with a predefined temporal period.

The system and method for simulating the operation of an enterprise inventory management system can further include modifying, in response to the performance metrics, the computing resources associated with the global inventory database subsystem. The system and method can also generate a report of the one or more performance metrics correlated to data received from one or more instances of the simulated RFID interrogator subsystem.

In a specific embodiment, each instance of the simulated RFID interrogator subsystem generates data representative of expected data from one or more real-world physical facilities. The expected data can be a function of the size of each of the one or more real-world physical facilities. The expected data can also be a function of the time zone where each of the one or more real-world physical facilities is located.

The foregoing has broadly outlined the essential and optional features of the various embodiments that will be described in detail hereinafter; the essential and certain optional features form the subject matter of the appended claims. Those skilled in the art should recognize that the principles of the specifically-disclosed systems and methods can be utilized as a basis for similar or functionally-equivalent systems and methods that may be within the scope of the appended claims.

BRIEF DESCRIPTION OF THE DRAWINGS

For a complete understanding of the present disclosure, reference is now made to the following detailed description taken in conjunction with the accompanying drawings, in which:

FIG. 3-A illustrates a method of operating an inventory data in an enterprise inventory management system;

FIG. 3-B illustrates a method of maintaining inventory data in an enterprise inventory management system utilizing multiple RFID interrogators;

Unless otherwise indicated, corresponding numerals and symbols in the different figures generally refer to corresponding parts or functions.

DETAILED DESCRIPTION

Radio frequency identification (RFID) systems utilize RFID reader/writer devices, also known as RFID interrogators, and RFID tags. Such systems can be used to locate and identify items to which the tags are attached; they are particularly useful in product-related industries for tracking inventory items through manufacture, distribution and sale. An RFID tag can be affixed to an individual product, its package, or a container for multiple products or packages.

An RFID tag typically includes an antenna section, a radio section, a power-management section, and frequently a non-volatile memory. Some RFID tags include an energy storage device, such as a battery. Tags for products for sale, however, are typically powered solely by the RF signal they receive; such tags do not include an energy storage device (e.g., a battery), but are passive tags.

RFID inventory management techniques utilize an RFID interrogator to inventory one or more items having RFID tags, where inventorying involves at least singulating a tag and receiving a unique identifier from the tag. "Singulated" is defined as an RFID interrogator singling-out one tag, potentially from among multiple tags. "Identifier" is defined as a number identifying the tag or the item to which the tag is attached, such as a tag identifier (TID) or an electronic product code (EPC). In typical systems, an RFID interrogator transmits a modulated RF command, receives a tag reply, and transmits an RF acknowledgement signal responsive to the tag reply. A tag that senses the interrogating RF wave responds by transmitting back another RF wave; the tag either generates the transmitted RF wave or reflects back a portion of the interrogating RF wave in a process known as backscatter. The reflected-back RF wave can encode data stored in the tag, such as the EPC. The response is decoded by the RFID interrogator, and can thereby identify, count, or otherwise interacted with the associated item; the decoded data can denote a serial number, a price, a date, a time, a destination, an encrypted message, an electronic signature, or any other attribute or status or combinations thereof. The systems and methods described hereinafter make use of such data to improve the operation and use of enterprise inventory management systems.

Figure 1:
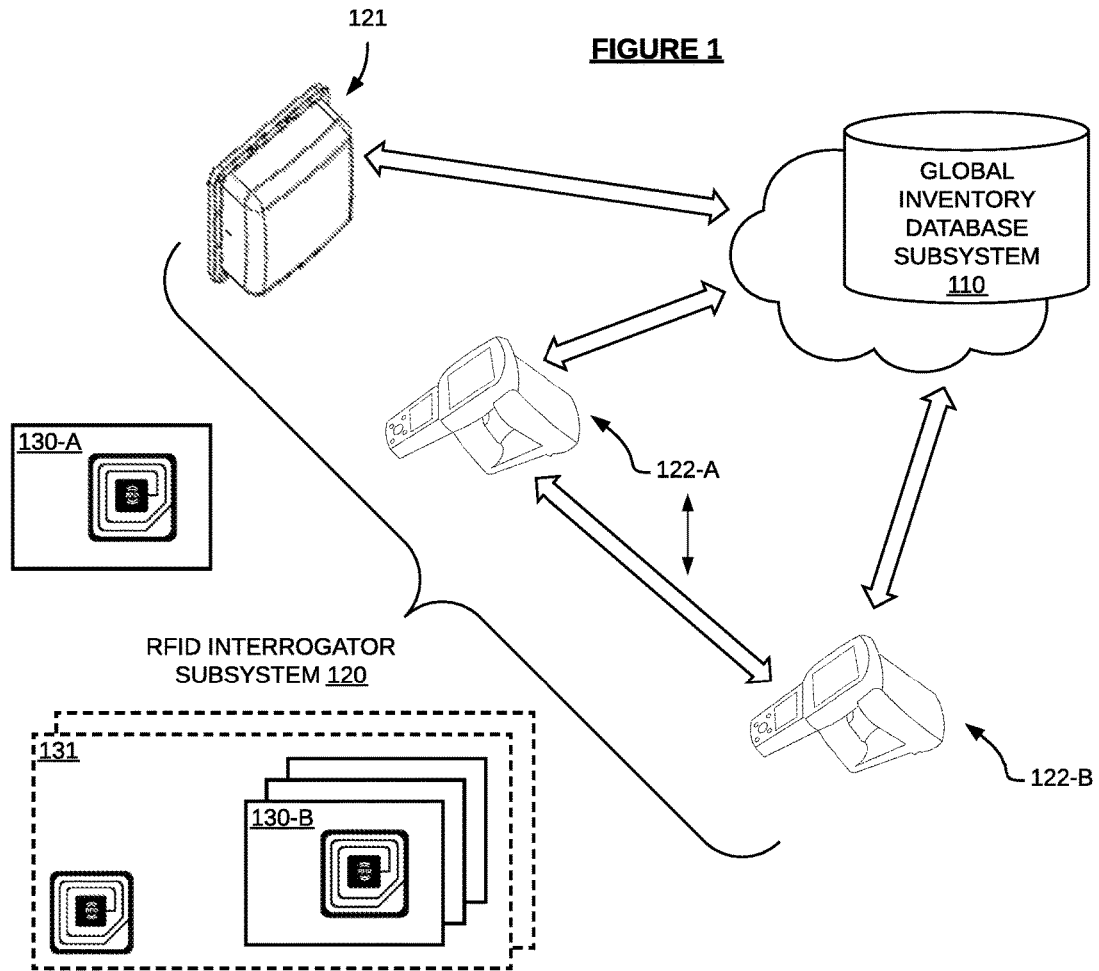
FIG. 1 illustrates the basic architecture of an enterprise inventory management system.

Turning now to FIG. 1, illustrated is a basic architecture of an enterprise inventory management system; the system includes a global inventory database subsystem 110 and an RFID interrogator subsystem 120. The global inventory database subsystem 110 (alternately referred to herein as a "server") can be local or remote; a remote location can be dedicated or cloud-based. The RFID interrogator subsystem 120 can include fixed RFID interrogators 121 (one shown) and/or mobile RFID interrogators 122-A and 122-B, which can be handheld. Each RFID interrogator has an interface to the global inventory database subsystem 110; the interface for a fixed RFID interrogator can be wired or at least partially wireless (e.g., to a local router Wi-Fi router), while mobile/handheld RFID interrogators are wireless. As will be described more fully hereinafter, RFID interrogators 122-A and 122-B can also include a direct wireless connection for the sharing of certain data; such a connection can be, for example, a Bluetooth® wireless connection. The RFID interrogators 121, 122-A and 122-B are operative to interact with RFID tags contained on items 130; an RFID tag can be provided on an individual item 130-A or on boxes of items 130-B; individual items or boxes of items having RFID tags can also be within a container having an RFID tag 131.

Figure 2:
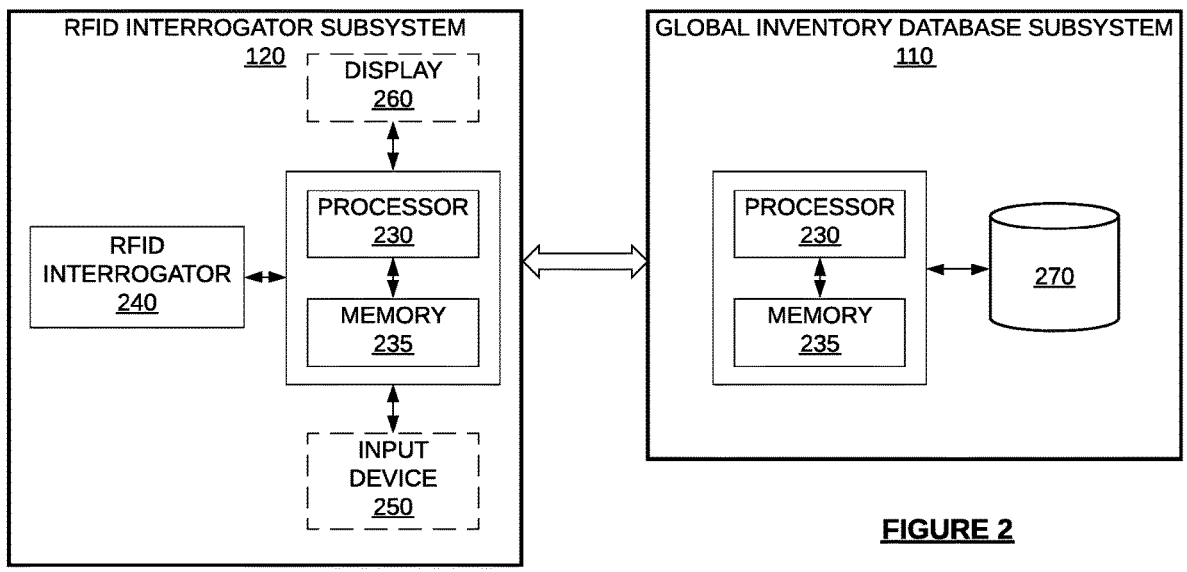
FIG. 2 illustrates the basic architecture of an RFID interrogator subsystem and global inventory database subsystem of an enterprise inventory management system.

Turning now to FIG. 2, the global inventory database subsystem 110 and RFID interrogator subsystem 120 are shown in more detail. In general, a global inventory database subsystem includes a processing system having at least one processor 230 and at least one memory 235, which are coupled to a non-volatile memory containing a database 270 for cataloging information related to a plurality of inventory items; the memory contains instructions which, when executed by the processor, are operative to perform the essential and optional functions of a global inventory database subsystem described herein. Similarly, each RFID interrogator device (e.g., 121, 122-A and 122-B shown in FIG. 1) of the RFID interrogator subsystem 120 each include a processing system having at least one processor 230 and at least one memory 235, which are coupled to a an RFID interrogator 240 for interacting with RFID tags affixed to items, boxes or containers; the memory contains instructions which, when executed by the processor, are operative to perform the essential and optional functions of RFID interrogators described herein. Each device of the RFID interrogator subsystem 120 can further include an input device 250 and/or a display 260. For example, handheld RFID interrogators 122-A and 122-B, as shown in FIG. 1, can each have an input keyboard and a display; a fixed RFID interrogator 121 typically does not have a keyboard or display, unless it is associated with or integrated into, for example, a sales register.

The novel methods for enterprise inventory management will be described with reference to the global inventory database subsystem 110 and RFID interrogator subsystem 120 illustrated in FIGS. 1 and 2. While the novel methods will be described in the environment of a warehouse and associated retail facilities, any facility for which item-level inventory is necessary or desired (e.g., manufacturing facilities, distribution centers, libraries and museums) can utilize the principles disclosed herein to advantage.

To fully understand the novel inventory management methods, and advantages thereof, disclosed herein, it is important to understand the basics of item-level inventory practices throughout the distribution chain. Conventionally, shipping verification for items is performed employing just a sampling process and is often performed by a manual count of shipped items. Such practices require substantial manpower and time; it is not an efficient utilization of human resources. While a stock keeping unit ("SKU") associated with each item can identify many attributes (e.g., manufacturer, description, material, size, color, etc.), it does not uniquely identify an item; each item can be uniquely identified, however, through use of an electronic product code ("EPC"), which is a union of an SKU and a serial number. The adoption and use of EPCs has provided the basis for many new and useful methods to intelligently manage the inventory of small to global enterprises.

In a warehouse (also referred to as a "distribution center"), an inventory management system must perform many functions, including receiving, inbound auditing, pick processing, pack auditing, and shipping verification. Upon receiving a shipment, inbound auditing can confirm whether all expected items are contained in the shipment. An RFID interrogator can read an RFID tag on each container, or RFID tags of each item in a container, to be checked against an advance shipping notice ("ASN"); any discrepancies between what is received and the ASN can be reported to the inventory management system.

An inventory management system manages all orders from a vendor/supplier. An order is placed on a supplier, for example, for a particular number of articles with a certain mix of styles, sizes and colors. There may be a large number, perhaps millions, or articles of different sizes, colors, brands, etc., in a warehouse at any point in time. Staff selectively select items in a pick process, conventionally from a paper pick list, and load the items on a transport mechanism (e.g., a conveyor belt) for delivery to another part of the warehouse for pack auditing, which was performed in conventional practice without RFID item-level tracking.

If an RFID interrogator is used to track and identify items, a pick order, as distinguished from a pack order, can be downloaded into the RFID interrogator from the inventory management system. For example, a large number of jackets, maybe thousands, may be selectively picked, and will be packed, perhaps 20 jackets per container, and transported by truck to various warehouses around the country. The pack auditing process audits the accuracy of the pick process.

An RFID tag of a pack (or container) can be scanned with an RFID interrogator and identification of all the items that should be placed in the pack can be downloaded from the inventory management system. The RFID interrogator can then be used to scan all the items on the transport mechanism to determine if there are any missing or incorrect items; the missing items can then be withdrawn from inventory to complete the order.

A pack allocation can identify the particular items and quantities in a pack. A container should thus contain a certain number and type of each item. As the container is packed, the assortment is verified, such as how many of a particular size, color, etc., are in the container. An audit can then be performed against a manifest, such as what types and quantities should be in the container. Recalling that an RFID interrogator reads an electronic product code, a label on the container can be taken to identify the SKUs and item serial numbers in the container, and even to know what particular items are in the container by EPC number. The data for each container can then be uploaded to the inventory management system. The result is one EPC of any article in a container can be employed with the inventory management system to identify the remaining articles in the container. The container is then sealed for shipment to a retail outlet or the next location on the distribution chain.

The containers can next be transported to shipping verification. The number of containers that are to be included in a shipment is known by the inventory management system, including the individual EPCs or identifiers of the items that are in each container. The inventory management system can identify which particular container(s) should be on a truck for each ASN. An ASN can be used as a shipping verification that indicates that a particular ASN includes a certain number of containers, and identifiers therefor. The containers themselves may/may not include RFID tags and ASNs, as compared to the items therein. As the containers pass through a portal, it may only be necessary to read one of the RFID tags of the items in each container because the items in each container are associated with each other and the corresponding container.

As the containers are loaded onto a truck, the number of containers for the shipment and the items therein can be verified with another RFID interrogator. The inventory management system needs to only read at least one RFID tag of an item in each container, and it can now identify all the items therein. The association of the items with a container alleviates the need to read all of the RFID tags of the items in a container, which could be very time consuming for containers holding many items. An item to container association is constructed by the inventory management system, and the ASN to container association can also be provided by the inventory management system.

The foregoing inventory process steps of receiving, inbound auditing, pick verification, pack auditing and shipping verification, can be performed whether RFID interrogators are used or not; the accuracy of each process, however, is typically increased from 75-90% to 90% or better when using RFID item-level inventory management systems and processes as described herein, typically resulting in a reduction (e.g., 30%) of claims against manufacturers, a reduction (e.g., 50%) of mis-shipments to retail organizations, and a reduction (e.g., 10-20%) of inventory loss and shrinkage.

Another inventory management process is omnichannel packing, which is typically executed in a warehouse/distribution center of a retail enterprise. When a customer places an order, which may be an online order, the retail enterprise may prefer that the customer pick up the order in one of its numerous physical stores, which thereby exposes the customer to further sales opportunities, or that the item be first shipped with other items to a retail store or distribution center proximate the purchaser, and then shipped from there to the purchaser. Whereas the retail enterprise already regularly ships new inventory to each physical store, it can save certain shipping expenses by adding the particular item to a scheduled shipment to a physical store proximate the customer's location. In such cases, an omnichannel pick process is employed wherein, during the pick process at the warehouse, the particular item is designated with a "reserve" status and is packed and isolated, typically in a plastic bag or other container, and provided with a customer identification tag; the reserved item is then included with the next general inventory shipment to the physical store proximate the customer's location.

When a shipment is received at a retail location, the containers are unloaded, and the RFID tags are again scanned utilizing an RFID interrogator; the RFID identities can be reconciled against an ASN. If the RFID tag of a particular item identifies it as "reserved", or it is identified on the ASN as such, it is set aside for customer pick-up or further shipment rather than being added to the general inventory. A challenge for RFID inventory management systems can be deciphering between existing items and new items in a shipment. To address that problem, the unique RFID identifiers for existing items can be downloaded to the RFID interrogator from the inventory management system; when the interrogator scans items, it can provide an audible alert for each RFID tag that is read, ignoring those of the existing items. When the audible alerts cease, the store personnel can be relatively assured that all new items have been scanned; the identities of those items can then be reconciled against an ASN, either by the RFID interrogator device or a server of the inventory management system. If the receiving operation identifies unexpected items (i.e., not including in the ASN), or fails to identify expected items, they can be indicated in a delivery accuracy report sent to the inventory management system.

Referring now to FIG. 3-A, illustrated is a method 300 of operating an inventory data in an enterprise inventory management system. The method includes processes, or steps, performed by the global inventory database subsystem 110 and RFID interrogator subsystem 120 as illustrated in FIGS. 1 and 2. The method 300 is characterized by first receiving by the RFID interrogator subsystem 120, from the global inventory database subsystem 110, at least one unique identification code for an item. As described supra, the global inventory database subsystem 110 catalogs all inventory items within an enterprise, and can generate an ASN 305, identifying one or more items, each by a unique identification code. The RFID interrogator subsystem 120 then is used to scan the RFID tags of items contained at a physical location; the physical location can be any point of the distribution chain, including a manufacturing facility, warehouse/distribution center, receiving/back stock zone or sales floor of a retail location. The RFID interrogator subsystem 120 can emit an audible tone for each scanned item having a unique identification code received from the global inventory database subsystem 110. If the purpose is to find a single particular item, the audible tone can be persistent and vary in intensity as a function of the distance of the RFID interrogator from the item; alternatively, or in addition, a display associated with the RFID interrogator can provide visual feedback indicating proximity to the item. Alternatively, if the purpose is to conduct an inventory of a plurality of items (e.g., verification of received items against an ASN or an inventory of items on a sales floor), the audible tone can have a short-duration and be emitted each time a unique identifier on a list received from the global inventory database subsystem 110 is scanned; a display associated with the RFID interrogator can also indicate a real-time count of scanned items of the plurality of items or the remaining number of those items to be scanned. Following the scanning of items, a report can be sent to the global inventory database system 110, identifying which items were identified/counted; alternatively, the reporting of individually scanned items can be performed in real-time as each item is scanned and the reconciliation against the requested item(s) or ASN can be performed by the global inventory management database 110. If appropriate, the global inventory database subsystem 110 can also, based on a received report, update the physical locations of scanned items 350, as well as an attribute/status for an item, such as whether an item is available, reserved, sold, damaged, on display, or unsalable.

In a second example, if an inventory of a sales floor is to be performed, an expected list of items can be downloaded from the global inventory database subsystem 110 to the RFID interrogator subsystem 120, and all items on the sales floor can be scanned. A display on a handheld RFID interrogator can display the number of expected items and the number of those that have been counted; the inventor process is considered complete when all expected items have been counted or when no further audible tones are emitted. If the count is less than the number of expected items, then it is known that the items not identified are not on the sales floor (an item may have been stolen or improperly moved to back stock); if additional items were identified, they may have been returned and not properly added to inventory or may have been improperly moved from back stock to the sales floor. The physical location and/or attributes/statuses for all scanned items can then be updated in the global inventory database subsystem 110; in addition, an RFID interrogator may update the tag of an item to change an attribute or status, such as changing the status of a returned item from "sold" to "available", or to update the physical location where the item should be located.

In another example, a "pick list" can be generated by the inventory management system; the list can identify, for example, items to be moved from back stock based on business rules, such as what quantity of each size of an item is to be maintained on a sales floor. To make in-store replenishment work properly, a reference shelf capacity, or planogram, is employed, and the inventory management system maintains information on the real-time display quantity per item. If the sales floor stock falls below the shelf capacity, in-store replenishment is triggered, and the article is automatically put on the in-store pick list. For this process, a pick list, with the unique identities of items in back stock to be moved, can be downloaded to a handheld RFID interrogator for use by a sales associate in locating the items in the back stock for moving to the sales floor, according to the process illustrated in FIG. 3-A.

Turning now to FIG. 3-B, illustrated is a variation on the method 300, wherein multiple RFID interrogators are employed. As described supra with reference to FIG. 1, RFID interrogators 122-A and 122-B can share data associated with scanned items 325, either directly or indirectly. A direct wireless connection can be, for example, a Bluetooth® wireless connection. Alternatively, or additionally, each RFID interrogator can share data indirectly through the global inventory database subsystem 110 by the immediate reporting of each scanned item, which can then be pushed to, or pulled by, another RFID interrogator. The shared data includes at least the unique identification code for each scanned item; the data associated with each scanned item can also include the date and time of a scanning event, whereby the enterprise inventory management system can synchronize data associated with each inventory item received from different RFID interrogators. For example, the system should maintain at least the most recent location and any attributes/status, together with the date and time; in some embodiments, maintaining a record of data from all scanning events can be helpful for inventory management or determining the basis for any discrepancies. Using the same exemplary sales floor inventory process described above, each RFID interrogator 122-A and 122-B can receive a list of expected items 310 and scan the RFID tags of items contained at a physical location 320; the RFID interrogators can share the data associated with scanned items 325, and each interrogator can emit an audible tone for each scanned item associated with a unique identification code on the list of expected items, but inhibit the tone for previously scanned items as well as items identified by shared data 335 (i.e., items scanned by another RFID interrogator). Similarly, if a first RFID interrogator scans an item not on the list of expected items, it can log the identity of the item for immediate or subsequent reporting to the global inventory database subsystem 110, and share the identity of the item with a second RFID interrogator; if the second RFID interrogator then also reads the identifier of the item not on the expected list, it is aware that the first RFID interrogator previously identified the item and does not need to report it to the global inventory database subsystem. Thus, two or more persons using individual handheld RFID interrogators can simultaneously perform an inventory process.

Figure 4:
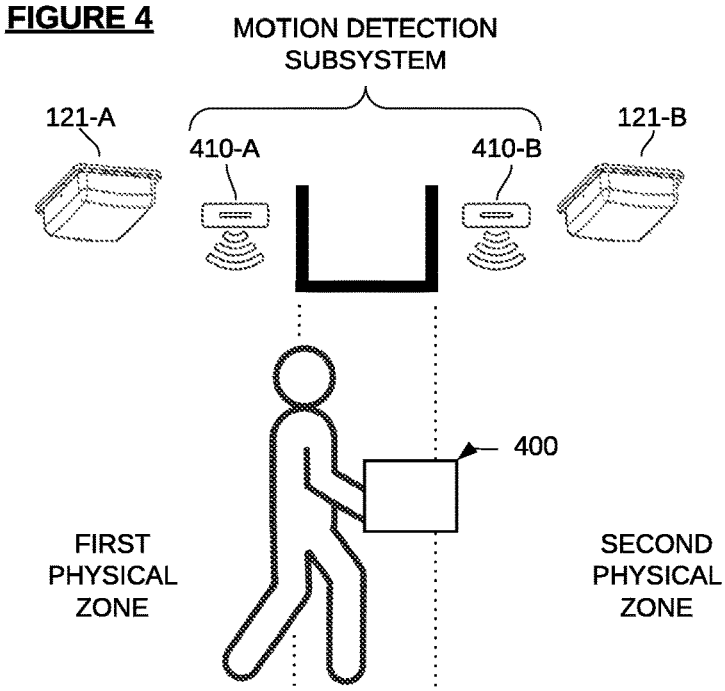
FIG. 4 illustrates an inventory management system including a motion detection subsystem.
Figure 5:
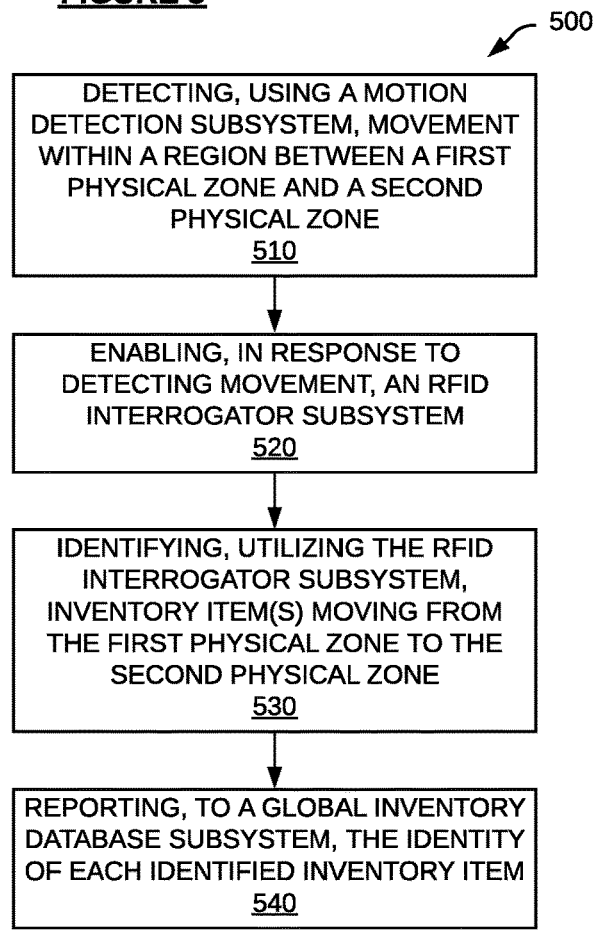
FIG. 5 illustrates a method of operating an inventory management system including a motion detection subsystem.

Referring now to FIGS. 4 and 5, illustrated are an inventory management system including a motion detection subsystem and method of operation thereof, respectively. As illustrated in FIG. 4, a motion detection system, which includes at least one motion detector 410, is provided proximate to a region between a first physical zone and a second physical zone; the first and second physical zones can be, for example, the back stock region and sales floor of a store. The motion detection system can utilize, for example, an infrared sensor, a microwave sensor, an ultrasonic sensor, or a video camera sensor. As with the inventory management systems described infra, an RFID interrogator system, which can include one or more RFID interrogators 121, is also provided proximate to the region between the first and second physical zones; the RFID interrogators are preferably fixed. With reference to FIG. 5, the method 500 includes the step of detecting 510, using the motion detection subsystem, movement within the region between the first and second physical zones; in response to detecting movement, the RFID interrogator subsystem is enabled 520. As used herein, "enabled" or "enabling" means to either activate the RFID interrogator subsystem (if generally inactivated) or to allow it to interrogate RFID tags (if generally activated). Once activated or otherwise allowed to interrogate RFID tags, the RFID interrogator subsystem identifies any inventory item(s) 400 moving from the first physical zone to the second physical zone 530; the identity of any such items are then reported to the global inventory database subsystem 540, which can then update the location of each inventory item moved between the physical zones.

In the embodiment illustrated in FIG. 4, the motion detection system includes first and second motion detection sensors 410-A and 410-B positioned such that movement from the first physical zone to the second physical zone is indicated if the first sensor is triggered before the second sensor, and from the second physical zone to the first physical zone if the second sensor is triggered before the first sensor. Alternatively, or in addition, the RFID interrogator system can include first and second RFID interrogators 121-A and 121-B positioned such that their associated read zones are non-overlapping, and wherein movement of an item from the first physical zone to the second physical zone is indicated if the first RFID interrogator reads an RFID tag of the item before the second RFID interrogator, and from the second physical zone to the first physical zone if the second RFID interrogator reads the RFID tag of the item before the first RFID interrogator.

Figure 6:
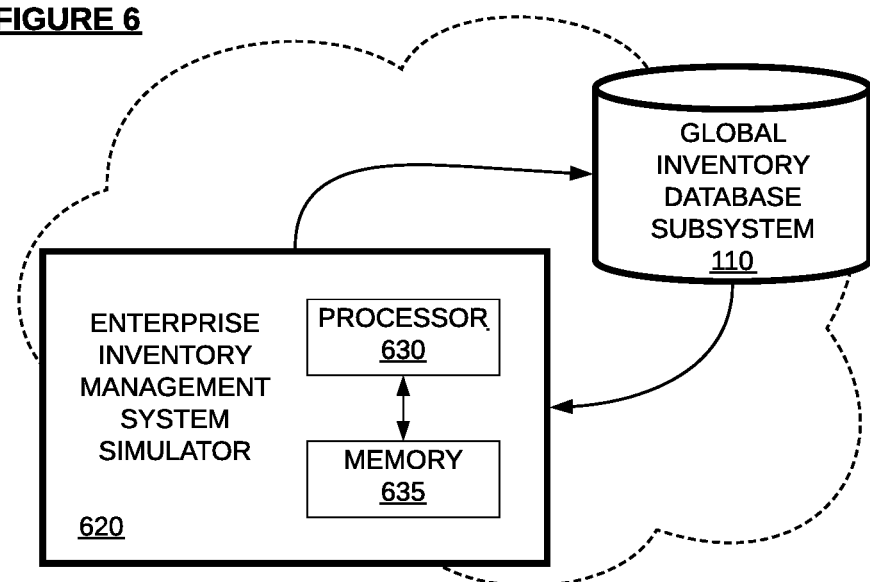
FIG. 6 illustrates a system for simulating the operation of an enterprise inventory management system; and, FIG. 7 illustrates a method of operating a system for simulating the operation of an enterprise inventory management system.

Referring now to FIGS. 6 and 7, illustrated are a system for simulating the operation of an enterprise inventory management system and method of operation thereof, respectively. The system and method can be used to advantage to plan and optimize a real-world system, whereby the costs of implementation and operation can be known in advance. The system preferably includes a functional (i.e., real-world) global inventory database subsystem 110, and an enterprise inventory management system simulator 620 rather than a functional RFID interrogator subsystem (e.g., RFID interrogator subsystem 120; see FIGS. 1 and 2); the simulator 600 includes a processing system having at least one processor 630 and at least one memory 635; the memory contains instructions which, when executed by the processor, are operative to perform the essential and optional functions of the system and method for simulating the operation of an enterprise inventory management system as described herein. Referring to FIG. 7, the method of simulation 700 includes the step of instantiating at least a first instance of a simulated RFID interrogator subsystem on a computing system 710. In a step 720, the simulated RFID interrogator subsystem generates data representative of the simulated reading of RFID tags associated with virtual inventory items and reports the data to the global inventory database subsystem 110; the global inventory database subsystem 110 receives the data from the simulated RFID interrogator subsystem in a step 730.

One or more performance metrics for the global inventory database subsystem 110 are generated based on the receipt of the data from the simulated RFID interrogator subsystem (step 740). In response to the one or more performance metrics, the generation rate of data by the first instance of the simulated RFID interrogator subsystem can be altered, or additional instances of the simulated RFID interrogator subsystem can be instantiated, to generate additional data, until a performance metric of the global inventory database system reaches a predefined value (step 750). The method can further include the step 745 wherein, in response to the performance metrics, the computing resources associated with the global inventory database subsystem are modified. The method can also include a step 760, wherein a report is generated of the one or more performance metrics correlated to data received from one or more instances of the simulated RFID interrogator subsystem.

For global enterprises which often have hundreds of manufacturing facilities, warehouses, distribution centers, and/or retail stores, it is important to properly plan and optimize an inventory management system prior to implementation. The system and method described can facilitate doing so. Each instance of a simulated RFID interrogator subsystem can generate data representative of expected data from one or more real-world physical facilities. For example, the expected data can be a function of the size of each of the one or more real-world physical facilities; e.g., the number of inventory items for a particular physical location is typically a function of the square footage. The expected data can also be a function of the time zone where each of the one or more real-world physical facilities is located, thus allowing for the system to anticipate and accommodate different data rates based on different working hours. Similarly, a performance metric can, for example, represent an instantaneous value or an average value associated with a predefined temporal period; the temporal period might be used as a control for a maximum data throughput or an average value over a period of hours, days or weeks, thus accommodating different policies for performing inventory procedures. For example, based on the anticipated data for an enterprise exceeding a predefined value, the computing resources associated with the global inventory database subsystem can be modified (e.g., increased) or the inventory policies of the enterprise can be altered to reduce the peak data rate (e.g., by having different physical locations perform inventory operations on different days or at different times).

The foregoing has described various embodiments of enterprise inventory management systems and methods of operation thereof; and, in particular, to systems utilizing RFID interrogators. The disclosed systems and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

We claim:

1. A method for simulating the operation of an enterprise inventory management system, comprising:
    instantiating at least a first instance of a simulated radio frequency identification (RFID) interrogator subsystem on a computing system;
    generating, by said simulated RFID interrogator subsystem, data representative of each of a plurality of virtual inventory items that are expected from a plurality of real-world physical facilities and reporting said data to a global inventory database subsystem;

receiving, at said global inventory database subsystem, said data from said simulated RFID interrogator subsystem;

generating one or more performance metrics for said global inventory database subsystem, said performance metrics being a function of the receipt and processing of said data from said simulated RFID interrogator subsystem; and, in response to said one or more performance metrics, altering the generation rate of said data by at least said first instance of said simulated RFID interrogator subsystem, or altering the instances of said simulated RFID interrogator subsystem, wherein each RFID interrogator subsystem is representative of at least one real-world physical facility, until a performance metric of said global inventory database subsystem reaches a predefined value.

2. The method recited in claim 1, further comprising the step of modifying, in response to said performance metrics, the computing resources associated with said global inventory database subsystem.

3. The method recited in claim 1, wherein each instance of said simulated RFID interrogator subsystem generates data representative of expected data from one or more real-world physical facilities.

4. The method recited in claim 3, wherein said expected data is a function of the size of each of said one or more real-world physical facilities.

5. The method recited in claim 3, wherein said expected data is a function of the time zone where each of said one or more real-world physical facilities is located.

6. The method recited in claim 1, wherein at least one of said one or more performance metrics represents an instantaneous value.

7. The method recited in claim 1, wherein at least one of said one or more performance metrics represents an average value associated with a predefined temporal period.

8. The method recited in claim 1, further comprising the step of generating a report of said one or more performance metrics of said global inventory database subsystem correlated to data received from one or more instances of said simulated RFID interrogator subsystem.

9. A system for simulating the operation of an enterprise inventory management system, comprising:

at least one processor and at least one memory, said at least one memory containing instructions which, when executed by said at least one processor, are operable to:

instantiate at least a first instance of a simulated radio frequency identification (RFID) interrogator subsystem, said simulated RFID interrogator subsystem operable to generate data representative of each of a plurality of virtual inventory items that are expected from a plurality of real-world physical facilities and report said data to a global inventory database subsystem;

generate one or more performance metrics for said global inventory database subsystem, said performance metrics being a function of the receipt and processing of said data from said simulated RFID interrogator subsystem; and, in response to said one or more performance metrics, alter the generation rate of said data by at least said first instance of said simulated RFID interrogator subsystem, or altering the instances of said simulated RFID interrogator subsystem, wherein each RFID interrogator subsystem is representative of at least one real-world physical facility, until a performance metric of said global inventory database subsystem reaches a predefined value.

10. The system recited in claim 9, wherein said system is further operative to modify, in response to said performance metrics, the computing resources associated with said global inventory database subsystem.

11. The system recited in claim 9, wherein each instance of said simulated RFID interrogator subsystem generates data representative of expected data from one or more real-world physical facilities.

12. The system recited in claim 11, wherein said expected data is a function of the size of each of said one or more real-world physical facilities.

13. The system recited in claim 11, wherein said expected data is a function of the time zone where each of said one or more real-world physical facilities is located.

14. The system recited in claim 9, wherein at least one of said one or more performance metrics represents an instantaneous value.

15. The system recited in claim 9, wherein at least one of said one or more performance metrics represents an average value associated with a predefined temporal period.

16. The system recited in claim 9, further comprising the step of generating a report of said one or more performance metrics of said global inventory database subsystem correlated to data received from one or more instances of said simulated RFID interrogator subsystem.

* * * * *